(12) United States Patent
Moon et al.

(10) Patent No.: US 11,253,872 B2
(45) Date of Patent: Feb. 22, 2022

(54) DUST COLLECTING MODULE AND DESULFURIZING APPARATUS HAVING SAME

(71) Applicant: DOOSAN HEAVY INDUSTRIES & CONSTRUCTION CO., LTD., Changwon-si (KR)

(72) Inventors: Sangchul Moon, Seoul (KR); Jinwoon Lee, Gimhae-si (KR); Sangrin Lee, Changwon-si (KR); Joonhyuk Yim, Goyang-si (KR); Jaedong Hwang, Gunsan-si (KR)

(73) Assignee: DOOSAN HEAVY INDUSTRIES & CONSTRUCTION CO., LTD., Gyeongsangnam-do (KR)

( * ) Notice: Subject to any disclaimer, the term of this patent is extended or adjusted under 35 U.S.C. 154(b) by 504 days.

(21) Appl. No.: 16/215,640

(22) Filed: Dec. 11, 2018

(65) Prior Publication Data

US 2020/0108403 A1    Apr. 9, 2020

(30) Foreign Application Priority Data

Oct. 4, 2018   (KR) .......................... 10-2018-0118516
Oct. 11, 2018  (KR) .......................... 10-2018-0121412

(51) Int. Cl.
*B03C 3/82* (2006.01)
*B03C 3/12* (2006.01)
(Continued)

(52) U.S. Cl.
CPC ............ *B03C 3/82* (2013.01); *B01D 53/1481* (2013.01); *B01D 53/185* (2013.01);
(Continued)

(58) Field of Classification Search
CPC combination set(s) only.
See application file for complete search history.

(56) References Cited

U.S. PATENT DOCUMENTS 3,511,030 A * 5/1970 Brown ...................... B03C 3/66
                                              96/25
3,714,762 A * 2/1973 Fillies et al. ............. B03C 3/70
                                              95/59
(Continued)

FOREIGN PATENT DOCUMENTS

DE    202010015173 U1    5/2011
JP        08-243436 A    9/1996
(Continued)

*Primary Examiner* — Christopher P Jones
*Assistant Examiner* — Sonji Turner
(74) *Attorney, Agent, or Firm* — Invenstone Patent, LLC

(57) ABSTRACT

A dust collecting module for reducing vibration by maintaining a distance between electrodes includes an arrangement of discharge electrodes and dust collecting electrodes alternately disposed and spaced apart from each other, the discharge electrodes configured to be charged to a predetermined voltage for generating a corona discharge between the discharge electrodes and the dust collecting electrodes, at least one dust collecting electrode of the dust collecting electrodes having a first hole; a first hole jig received in the first hole and fixed to the at least one dust collecting electrode, the first hole jig having a larger thickness than the at least one dust collecting electrode; a first tie rod coupled to the discharge electrodes and configured to pass through and fix the discharge electrodes by being fitted into the first hole jig; and a second tie rod coupled to the dust collecting electrodes to fix the dust collecting electrodes.

13 Claims, 16 Drawing Sheets

(51) Int. Cl.
  *B03C 3/70* (2006.01)
  *B03C 3/41* (2006.01)
  *B03C 3/47* (2006.01)
  *B03C 3/013* (2006.01)
  *B01D 53/14* (2006.01)
  *B01D 53/18* (2006.01)
  *B01D 53/50* (2006.01)
  *B01D 53/73* (2006.01)
  *B01D 53/80* (2006.01)
  *B01D 53/32* (2006.01)

(52) U.S. Cl.
  CPC ......... *B01D 53/323* (2013.01); *B01D 53/502* (2013.01); *B01D 53/73* (2013.01); *B01D 53/80* (2013.01); *B03C 3/013* (2013.01); *B03C 3/12* (2013.01); *B03C 3/41* (2013.01); *B03C 3/47* (2013.01); *B03C 3/70* (2013.01); *B01D 2251/404* (2013.01); *B01D 2257/302* (2013.01)

(56) References Cited

U.S. PATENT DOCUMENTS

| | | | | |
|---|---|---|---|---|
| 3,831,351 A | * | 8/1974 | Gibbs | B03C 3/60 96/91 |
| 3,972,701 A | * | 8/1976 | Teel | B03C 3/40 96/88 |
| 4,294,591 A | * | 10/1981 | Kahl | B03C 3/70 174/211 |
| 4,375,364 A | * | 3/1983 | Van Hoesen | B03C 3/41 361/226 |
| 4,516,992 A | * | 5/1985 | Jonelis | B03C 3/86 29/825 |
| 4,700,014 A | * | 10/1987 | Joy | H01B 17/52 174/31 R |
| 4,885,139 A | * | 12/1989 | Sparks | B01D 53/501 422/169 |
| 7,767,150 B1 | * | 8/2010 | Zaromb | G01N 1/2202 422/400 |
| 8,052,782 B2 | * | 11/2011 | Mochizuki | B03C 3/08 96/83 |
| 8,308,853 B2 | * | 11/2012 | Bender | B03C 3/86 96/83 |
| 8,337,600 B2 | * | 12/2012 | Paur | B03C 3/86 96/58 |
| 2010/0074828 A1 | | 3/2010 | Singh | |

FOREIGN PATENT DOCUMENTS

| | | |
|---|---|---|
| JP | 10-296128 A | 11/1998 |
| JP | 3918831 B2 | 5/2007 |
| JP | 2010063966 * | 3/2010 |
| JP | 2013-212455 A | 10/2013 |
| KR | 10-1108123 B1 | 1/2012 |
| KR | 10-1478770 B1 | 1/2015 |
| KR | 10-1901572 B1 | 9/2018 |

* cited by examiner

DUST COLLECTING MODULE AND DESULFURIZING APPARATUS HAVING SAME

CROSS REFERENCE TO RELATED APPLICATIONS

The present application claims priority to Korean Patent Application No. 10-2018-0118516, filed on Oct. 4, 2018, and No. 10-2018-0121412, filed on Oct. 11, 2018, the entire contents of which are incorporated herein for all purposes by this reference.

BACKGROUND OF THE INVENTION

1. Field of the Invention

The present invention relates to a dust collecting module for collecting dust by electrostatic force, and a desulfurizing apparatus having the dust collecting module.

2. Description of the Background Art

In general, acidic components such as hydrogen chloride (HCl), sulfur oxides (SOx), hydrogen fluoride (HF), and similar components, which are present in the exhaust gas generated during combustion of materials in steelworks or boilers in large-scale incineration plants or thermal power plants, cause air pollution and are harmful to the human body. Such components are removed from the exhaust gas through various methods.

The method for removing sulfur dioxide in the exhaust gas includes a dry desulfurization process in which dry powders, such as slaked lime or activated carbon, as a neutralizing agent are injected into and brought into contact with exhaust gas during the discharge of the exhaust gas to remove sulfur components from the exhaust gas, and a wet desulfurization process in which an absorption solution containing an aqueous slurry of caustic soda, magnesium hydroxide, or limestone, as a neutralizing agent, is sprayed onto and brought into contact with exhaust gas to remove sulfur components from the exhaust gas.

In wet desulfurization, the exhaust gas is gas-liquid contacted with an absorbing fluid containing an alkali such as lime, so that $SO_2$ is absorbed and removed from the exhaust gas. As a result, $SO_2$ absorbed from the exhaust gas forms sulfite in the absorbing fluid. In order to oxidize the sulfite to form a stable sulfite, it is conventional to oxidize the sulfite by blowing air into the absorbing fluid.

A conventionally used wet-type flue gas desulfurization apparatus is a so-called oxidation tank type. In this type of apparatus, an oxygen-containing gas (typically air) is blown into the tank of an absorption tower, where the oxygen-containing gas is brought into contact with the slurry (containing a calcium compound such as lime) having sulfur dioxide absorbed therein to oxidize the sulfur dioxide in the tank.

The air discharged from the desulfurization apparatus is removed by an electrostatic dust collector, which is installed separately from the desulfurization apparatus to collect the dust contained in the flue gas.

Typically, in the electrostatic dust collector, the particulate matter is charged by the corona discharge of a discharge electrode, and the charged particulate matter is collected on a dust collecting plate by electrostatic force. The electrostatic dust collector has a large number of discharge electrodes and dust collecting electrodes. However, excessive vibration is generated in the electrodes of a contemporary structure during operation, which results in damage to the structure.

SUMMARY OF THE INVENTION

Accordingly, the present invention has been made keeping in mind the above problems occurring in the related art, and an object of the present invention is to provide a dust collecting module capable of preventing damage and reducing vibration by maintaining a distance between dust collecting electrodes and discharge electrodes.

According to an aspect of the present invention, a dust collecting module may include an arrangement of discharge electrodes and dust collecting electrodes alternately disposed and spaced apart from each other, the discharge electrodes configured to be charged to a predetermined voltage for generating a corona discharge between the discharge electrodes and the dust collecting electrodes, at least one dust collecting electrode of the dust collecting electrodes having a first hole; a first hole jig received in the first hole and fixed to the at least one dust collecting electrode, the first hole jig having a larger thickness than the at least one dust collecting electrode; a first tie rod coupled to the discharge electrodes and configured to pass through and fix the discharge electrodes by being fitted into the first hole jig; and a second tie rod coupled to the dust collecting electrodes to fix the dust collecting electrodes.

The first hole jig may include a base part contacting a surface of the at least one dust collecting electrode, and a support protrusion protruding from the base part through the first hole.

The first hole jig may include a first jig part and a second jig part, wherein the first jig part and the second jig part each has a side surface engaged with the side surface of the other.

The dust collecting module may further include an upper jig provided to an upper end of the dust collecting module. The upper jig may extend in a stacking direction of the dust collecting electrodes and may include a plurality of first slots into which the dust collecting electrodes are respectively inserted, a plurality of second slots into which the discharge electrodes are respectively inserted, a rod groove into which the first tie rod is inserted, a first stepped portion into which the base part of the first hole jig is inserted, and a second stepped portion into which the support protrusion of the first hole jig is inserted.

At least one discharge electrode of the discharge electrodes may have a second hole through which the second tie rod passes, and the dust collecting module may further include a second hole jig received in the second hole, wherein the second tie rod fitted into the second hole jig.

According to another aspect of the present invention, a desulfurization apparatus may include an absorption tower having an exhaust gas inlet and an exhaust gas outlet; a plurality of absorption liquid supply pipes extending in a transverse direction of the absorption tower, each absorption liquid supply pipe having a spray nozzle; a dust collecting module including a plurality of discharge electrodes and a plurality of dust collecting electrodes disposed on the absorption liquid supply pipes such that the discharge electrodes and the dust collecting electrodes are erected in a height direction of the absorption tower; and a pressing locking member secured within the absorption tower in a state in which a pressing force is applied to the dust collecting module.

The pressing locking member may include a housing, an insulator provided in the housing, and a compressing rod coupled to the insulator and may further include a compressing support fixedly provided to the compressing rod to compress the dust collecting module.

The desulfurization apparatus may further include a support bolt provided to the compressing support such that the support bolt is able to be bolted to the dust collecting module; and an adjustment member movably screwed to the compressing support to adjust a compressing force applied by the pressing locking member.

The desulfurization apparatus may further include a support tube provided at a lower portion of the housing, wherein the compressing rod passes through the support tube; and an air inlet formed on one side of the housing, and a purge air supply pipe connected to the air inlet, wherein purge air is discharged through the support tube.

The dust collecting module may further include a first tie rod fixed to the discharge electrodes so as to pass through the dust collecting electrodes.

The desulfurization apparatus may further include an upper support arranged externally with respect to the dust collecting module to extend in a width direction of the dust collecting module, wherein the first tie rod is fixed to the upper support.

The upper support may include two upper supports respectively provided at outer sides of the dust collection module; and a single central upper support provided at a center of the dust collection module, wherein the pressing locking member compresses the two upper supports.

The upper support may include a front plate; a rear plate disposed opposite to the front plate, the rear plate having a smaller height than the front plate; and a support plate spine connecting the front plate and the rear plate, and may further include a coupling plate part extending downward from a portion of the rear plate to which the pressing locking member is coupled; and a plurality of reinforcing ribs disposed between the front plate and the rear plate.

The desulfurization apparatus may further include a plurality of upper insulators disposed inside the pressing locking member, each upper insulator having a planar shape in which a vent hole is formed for passage of purge air.

According to a further aspect of the present invention, a desulfurization apparatus may include an absorption tower having an exhaust gas inlet and an exhaust gas outlet; a plurality of absorption liquid supply pipes extending in a transverse direction of the absorption tower, each absorption liquid supply pipe having a spray nozzle; a dust collecting module including a plurality of discharge electrodes, a plurality of dust collecting electrodes disposed on the absorption liquid supply pipes such that the discharge electrodes and the dust collecting electrodes are erected in a height direction of the absorption tower, and an upper support for supporting the discharge electrodes and the dust collecting electrodes being; and a pressing locking member secured within the absorption tower to compress the upper support so that the dust collecting module is electrically insulated in the absorption tower.

The pressing locking member may include a housing, an insulator provided in the housing, a compressing rod coupled to the insulator, and a compressing support fixed to the compressing rod to compress the upper support.

As described above, according to embodiments of the present invention, the hole jig is provided to the dust collecting electrode to prevent the discharge electrode and the dust collecting electrode from colliding with each other. Further, since the dust collecting module is fixed in a compressed state by the pressing locking member, the vibration generated in the dust collecting module can be reduced.

DETAILED DESCRIPTION OF THE INVENTION

Figure 1:
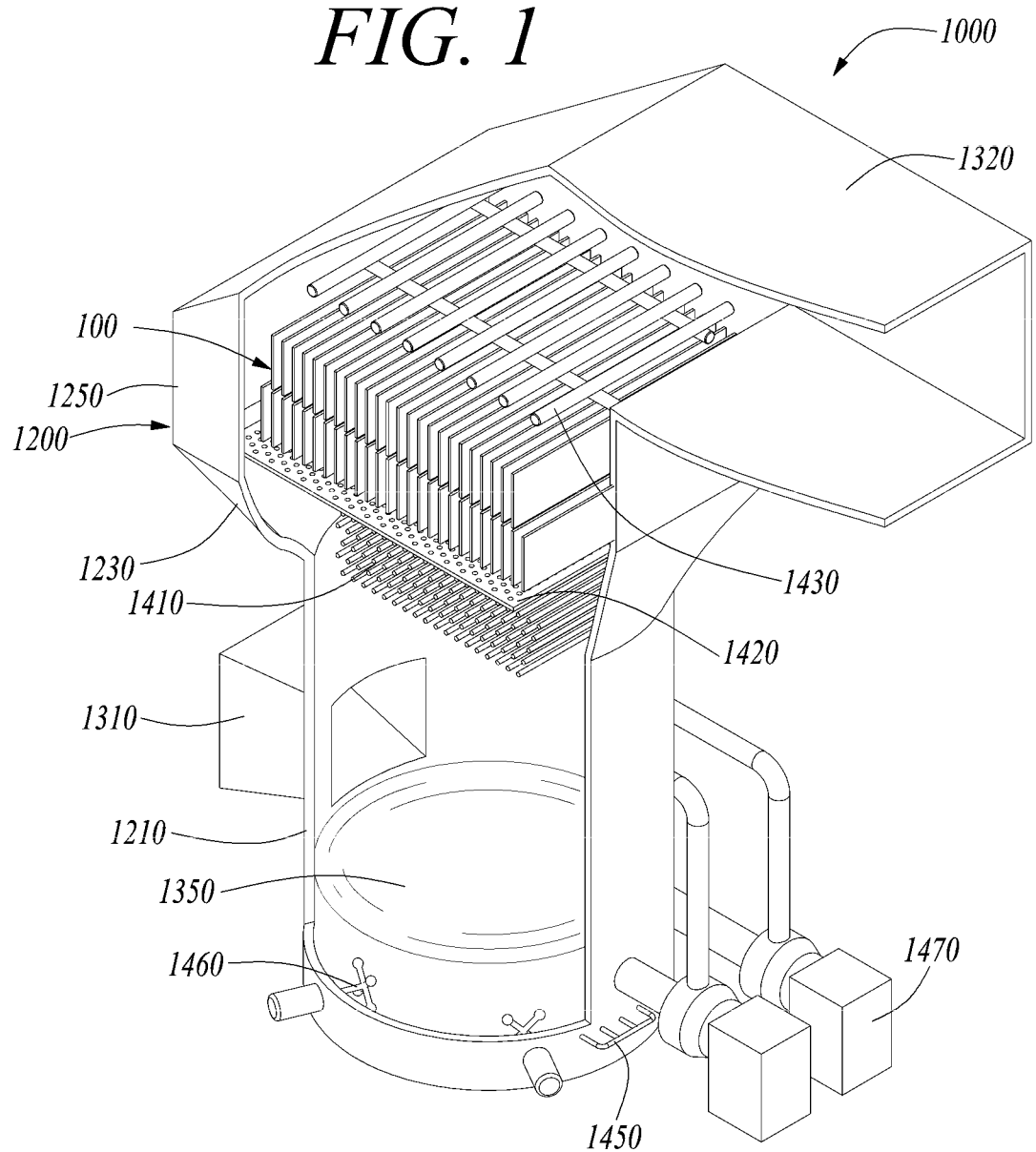
FIG. 1 is a view showing a desulfurization apparatus according to a first embodiment of the present invention.

Hereinafter, exemplary embodiments of the present invention will be described in detail with reference to the accompanying drawings. However, it should be understood that the present invention is not limited to the disclosed embodiments, and includes all of modifications, equivalents, or substitutions falling within the spirit and scope of the invention.

The terminology used herein is for the purpose of describing particular embodiments only and is not intended to limit the invention. As used herein, the singular forms "a", "an", and "the" are intended to include the plural forms as well, unless the context clearly indicates otherwise. It will be further understood that the terms "comprises" and/or "comprising" or "includes" and/or "including" when used in this specification, specify the presence of stated features, numbers, steps, operations, elements or a combination thereof, but do not preclude the presence or addition of one or more other features, numbers, steps, operations, elements or a combination thereof.

Reference will now be made in greater detail to a preferred embodiment of the invention, an example of which is illustrated in the accompanying drawings. Wherever possible, the same reference numerals will be used throughout the drawings and the description to refer to the same or like parts. In the following description, it is to be noted that, when the functions of conventional elements and the detailed description of elements related with the present invention may make the gist of the present invention unclear, a detailed description of those elements will be omitted. Further, the shape and size of the elements shown in the drawings may be exaggerated, omitted, or schematically drawn to provide an easily understood description of the structure of the present invention.

A desulfurization apparatus of the present invention will now be described.

FIG. 1 show a desulfurization apparatus 1000 according to a first embodiment of the present invention.

Referring to FIG. 1, the desulfurization apparatus 1000 is provided for removing sulfur components, i.e., sulfur oxides (SOx), which are contained in the exhaust gas discharged from a boiler of a plant facility such as a thermal power plant, using a gas-liquid contact between the exhaust gas and an absorption liquid.

The desulfurization apparatus 1000 may include an absorption tower 1200, a plurality of absorption liquid supply pipes 1410, a plurality of absorption liquid pump 1470, an agitator 1460, an oxidizing air supply unit 1450, and a perforated plate 1420 for removal of droplets.

The absorption tower 1200 has a columnar shape having an inlet, an outlet, and an internal space, and serves to remove sulfur components and fine dust contained in the exhaust gas in the absorption tower 1200. The absorption tower 1200 is provided on a lower side with an inlet portion 1310 through which exhaust gas is introduced, and is provided on an upper side with an outlet portion 1320 through which is discharged exhaust gas with sulfur components and fine dust removed. The inlet portion 1310 has a tubular shape, and an exhaust gas generated by the combustion of fossil fuel such as coal in a boiler or the like is introduced into the absorption tower 1200 through the inlet portion 1310 and flows upward. The outlet portion 1320 may be formed from a rectangular tube which protrudes laterally from an upper end of the absorption tower 1200.

The absorption tower 1200 includes a cylindrical section 1210 having a circular cross section, a rectangular column section 1250 formed on the upper part of the column section 1210 and having a rectangular cross section, and an intermediate section 1230 connecting the cylindrical section 1210 and the rectangular column section 1250. The outlet portion 1320 is connected to the upper end of the rectangular column section 1250. A lower end of the variable section 1230 has a circular cross section, and an upper end of the variable section 1230 has a rectangular cross section.

The absorption liquid supply pipes 1410 extend in a transverse direction of the absorption tower 1200, each absorption liquid supply pipe 1410 has a spray nozzle. The absorption liquid supply pipes 1410 supply a slurry of limestone, which is supplied to the lower portion of the absorption tower 1200, upwards to the spray nozzle (not shown) provided on the upper side of the absorption tower 1200, using a pumping force by the absorption liquid pump 1470, so as to allow the absorption liquid to be sprayed into fine droplets through the spray nozzle. The sprayed absorption liquid is brought into contact with and reacts with the exhaust gas. The unreacted absorption liquid falls and is stored and then is pumped and recirculated by the absorption liquid pump 1470.

The lower side of the absorption liquid pipe 1410 may be provided with a porous plate (not shown), a region where the sulfur-containing exhaust gas is brought into contact with and reacts with the fine droplets of the absorption liquid. This region is called a spray zone where the sulfur dioxide contained in the exhaust gas reacts with water to produce sulfurous acid, which in turn reacts with the limestone to neutralize to produce calcium sulfite. The produced calcium sulfite, water, and unreacted absorption liquid fall downward and are stored, and the absorption liquid is recirculated and reused.

Calcium sulfite is oxidized with oxygen and water to produce gypsum and sulfuric acid in a reservoir 1350, in which the absorption liquid is stored, at the lower part of the absorption tower 100, and the sulfuric acid reacts with limestone again to neutralize to produce gypsum. A plurality of oxidizing air supply units 1450 are connected along the circumference of the bottom of the absorption tower 100 at regular intervals for oxidation reaction.

In the meantime, an agitator 1460 is provided below the absorption tower 1200 to accelerate the reaction by stirring the limestone slurry. In addition, a slurry supply pipe (not shown) for supplying slurry to the reservoir 1350 may be connected to the lower side of the absorption tower 1200.

A perforated plate 1420 for removing fine droplets may be installed on the upper side of the absorption liquid supply pipe 1410, specifically, in the intermediate section 1230.

A dust collecting module 100 and a frame assembly 20 for supporting the dust collecting module 100 are installed on the upper side of the perforated plate 1420. The dust collection module 100 may be configured such that two layers are stacked, as shown in FIG. 1, though the present invention is not limited to this configuration. That is, the dust collecting module 100 may be configured such that a single layer is formed or two or more layers are stacked.

A cleaning water supply unit 1430 for removing dust attached to the dust collecting electrode 13 is installed on the upper side of the dust collecting module 100. However, the present invention is not limited to this configuration of the wash water supply unit 1430, which may be embodied by various conventional structures.

Figure 2:
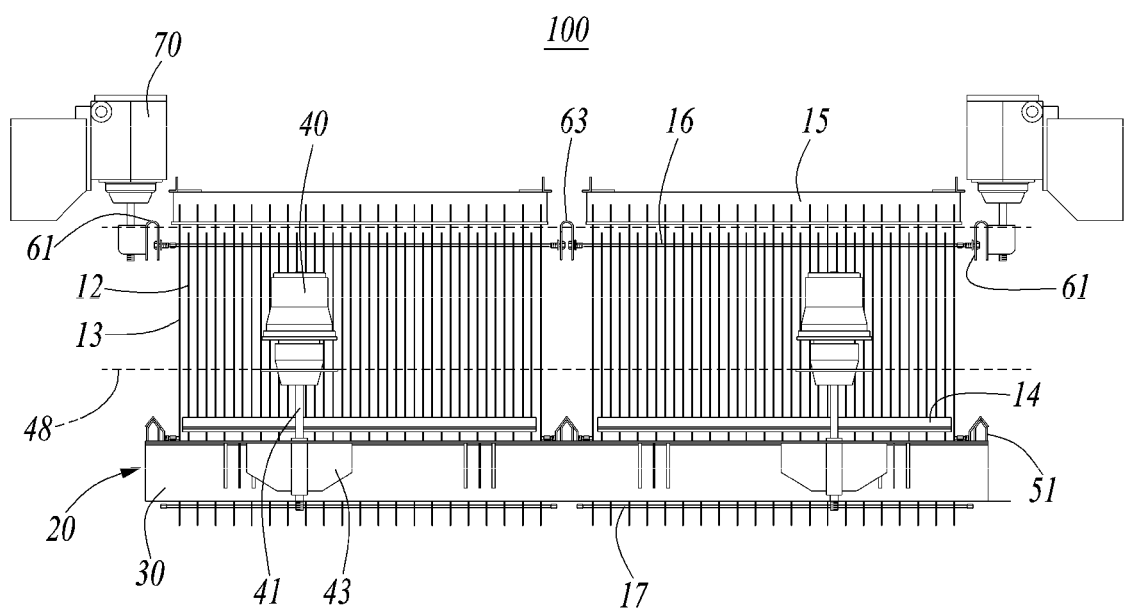
FIG. 2 is a side view showing a dust collecting module and a frame assembly according to the first embodiment of the present invention.
Figure 4:
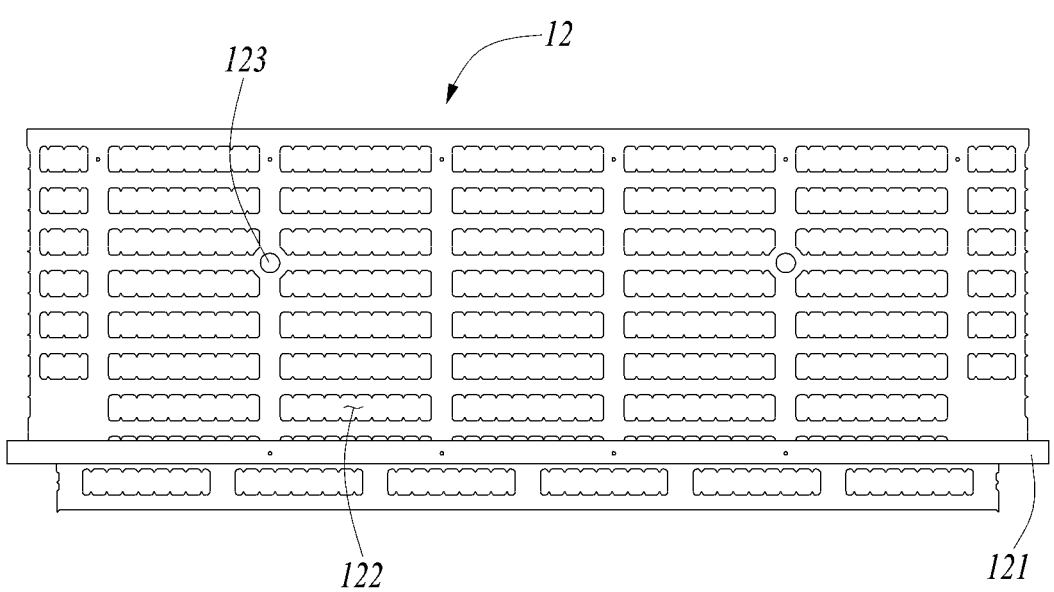
FIG. 4 is a front view showing a discharge electrode according to the first embodiment of the present invention.

FIG. 2 and illustrate a dust collecting module 100 according to a first embodiment of the present invention, and FIG. 4 illustrates a discharge electrode according to the first embodiment of the present invention.

Figure 3:
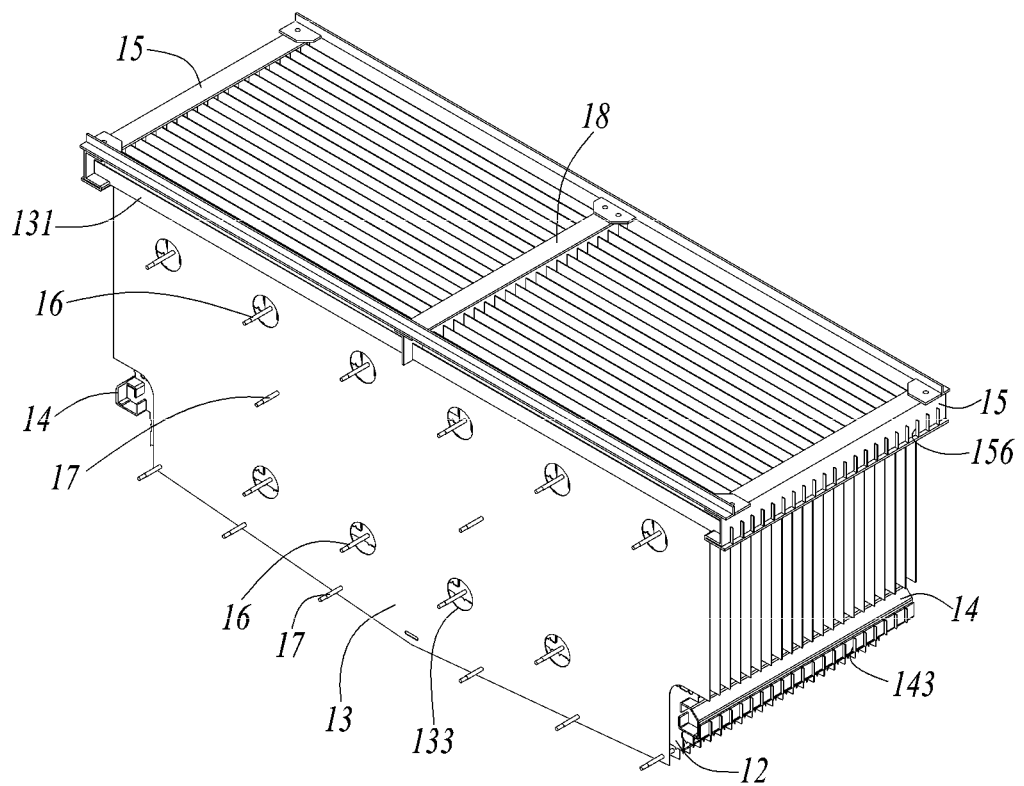
FIG. 3 is a perspective view showing the dust collecting module according to the first embodiment of the present invention.

Referring to FIGS. 2 to 4, the dust collecting module 100 is an electrostatic dust collector installed inside the absorption tower 1200 to remove dust contained in the exhaust gas. The dust collecting module 100 includes a plurality of discharge electrodes 12, a plurality of dust collecting electrodes 13, first tie rods 16, second tie rods 17, first setting beams 14, second setting beams 15, and a central setting beam 18. The dust collecting module 100 may be installed on the frame assembly 20 inside the absorption tower 1200 while being fixed by the tie rods and the setting beams.

Each of the discharge electrodes 12 has the general shape of a flat plate forming one of a plurality of discharge fins which are spaced apart from each other, and each discharge electrode 12 is provided with a plurality of openings 122 throughout. Thus, the discharge fins are present and effective around each of the openings 122 as well as along the edges of the flat plate. Each opening 122 may have a substantially rectangular shape, and the discharge fins may each have a needle-shaped cross-section.

Each discharge electrode 12 includes a first reinforcing rod 121 provided on a lower side of the plate and coupled to the first setting beams 14 to support the discharge electrode 12. The first reinforcing bar 121 is formed to be longer than the width of the discharge electrode 12 so as to protrude from both side ends of the discharge electrode 12. In addition, the discharge electrode 12 may be provided with a plurality of second holes 123 through which the second tie rods 17 pass.

Each dust collecting electrode 13 has the general shape of a flat plate and is provided with a plurality of first holes 133 through which the first tie rods 16 pass. To support the collecting electrodes 13, a second reinforcing rod 131 is disposed at an upper portion of each of the collecting electrodes 13. The second reinforcing rod 131 is longer than a width of the collecting electrode 13 and thus protrudes from both sides of the upper portion of the collecting electrode 13.

The discharge electrodes 12 and the dust collecting electrodes 13 are arranged in parallel to each other such that the dust collecting electrodes are disposed at regular intervals between the discharge electrodes 12. The plurality of discharge and collecting electrodes 12 and 13 erected and arranged in a height direction of the absorption tower 1200.

A high voltage is applied to the discharge electrode 12, so that a corona discharge occurs between the discharge electrode 12 and the dust collecting electrode 13 to generate an electrostatic force. In the present disclosure, a high voltage may be in a range of 10 KV to 120 KV. The discharge electrode 12 can be charged to a predetermined voltage, and the predetermined voltage may be in a range of 10 KV to 120 KV.

In other words, the dust collecting module 100 includes an arrangement of a plurality of the discharge electrodes 12 and a plurality of the dust collecting electrodes 13, which are alternately disposed and spaced apart from each other, and the discharge electrodes 12 are charged to a predetermined high voltage for generating a corona discharge between the electrodes 12 and 13.

During the flow of exhaust gas towards the region where the corona discharge and the electrostatic force are generated, the particulate matter is combined with the ions (electrons) generated by the corona discharge so as to be charged, and the charged particulate matter is attached to the dust collector 13 by the electrostatic force.

The first tie rod 16 is fitted into and coupled to the plurality of discharge electrodes 12 through the first holes 133 formed in the dust collecting electrodes 13 without being in contact with the dust collecting electrodes 13. The first tie rods 16 are provided on respective upper and lower sides of the discharge electrode 12.

A longitudinal end of the first tie rod 16 is threaded, and among the first tie rods 16, the first tie rods 16 disposed on the lower side are fixed to a lower support 51, and the first tie rods 16 disposed on the upper side are fixed to an upper support 61.

The second tie rods 17 are fitted into and coupled to the plurality of dust collecting electrodes 13 through the second holes 123 formed in the discharge electrodes 12 without being in contact with the discharge electrodes 12.

The second tie rods 17 may be respectively coupled to the upper and lower sides of the dust collecting electrode 13, and longitudinal ends of the second tie rods 17 may be fixed to the dust collecting electrode 13, though the present disclosure is not limited to this configuration. That is, the second tie rods 17 may be fixed to another member in the absorption tower 1200.

The first setting beam 14 is formed to extend in the stacking direction of the discharge electrodes 12, and has a plurality of lower slots 143 into which the side ends of the discharge electrodes 12 are inserted. The first reinforcing rod 121 is inserted into the first setting beam 14 such that a lower end of the first reinforcing rod 121 is supported by the first setting beam 14.

The second setting beam 15 is formed to extend in the stacking direction of the dust collecting electrodes 13, and has a plurality of upper slots 156 into which the side ends of the dust collecting electrodes 13 are inserted. The upper slots 156 may be spaced along a longitudinal direction of the second setting beam 15, and the second setting beam 15 may be located above the first setting beam 14. In the meantime, as illustrated in FIG. 2, a central setting beam 18 is formed at the widthwise center of the upper end of the dust collecting electrode 13, wherein the central setting beam 18 is formed in a T-shape and has a plurality of slots for receiving an insertion of the upper center of the dust collecting electrode 13.

The second reinforcing rod 131 is fixed to the upper end of the dust collecting electrode 13 through the second setting beam 15. The second reinforcing rod 131 is installed to penetrate the second setting beam 15 such that a lower end of the second reinforcing rod 131 is supported by the second setting beam 15.

As described above, the dust collecting module 100 according to the first embodiment includes the first tie rod 16, the second tie rod 17, the first setting beam 14, the second setting beam 15, and the central setting beam 18, thereby having an effect of stably fixing the discharge electrodes and the dust collecting electrodes while maintaining a distance therebetween.

Figure 5:
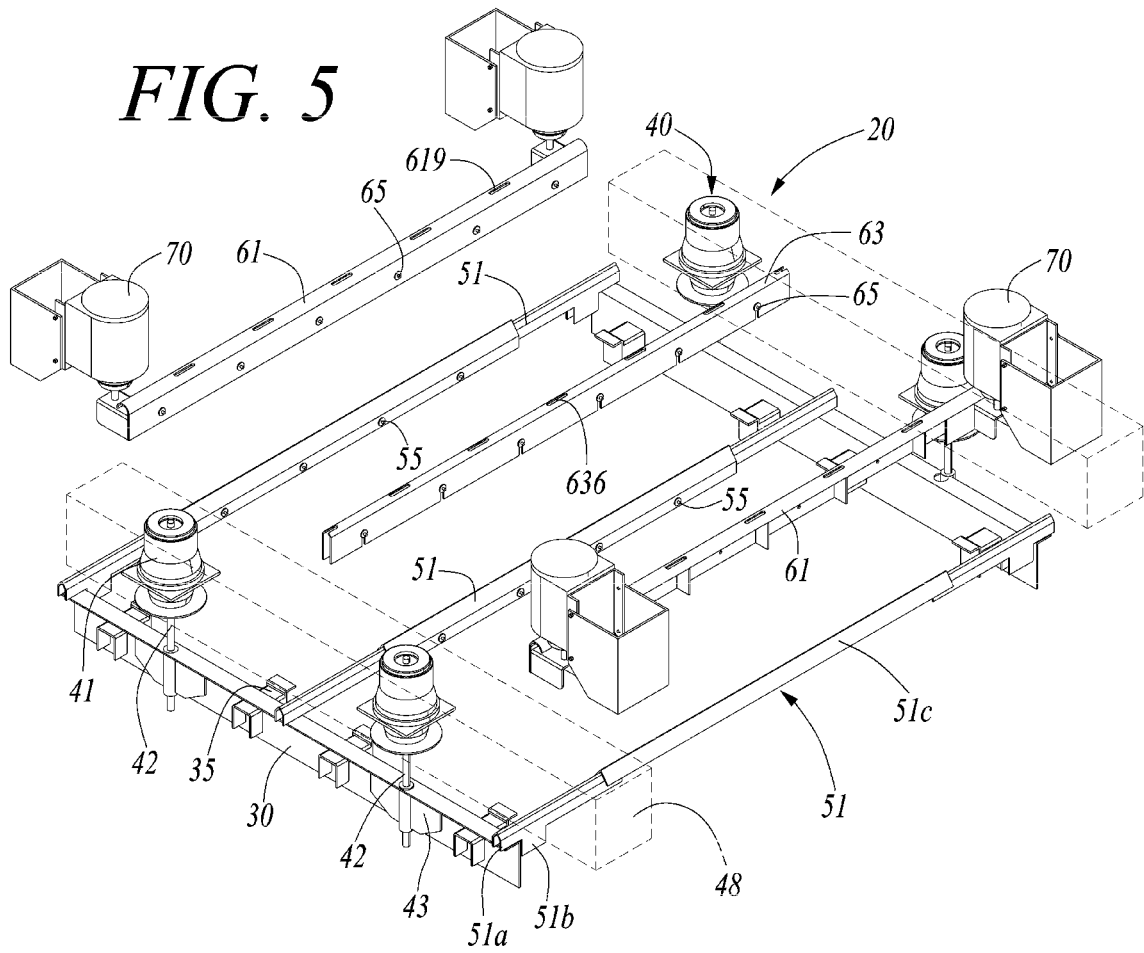
FIG. 5 is a perspective view showing the frame assembly according to the first embodiment of the present invention.

FIG. 5 illustrates a frame assembly 20 according to the first embodiment of the present invention.

Referring to FIGS. 2 and 5, the frame assembly 20 includes lower frames 30, a tubular girder 48, outer upper supports 61, lower supports 51, pressing locking members 70, and insulating connecting members 40.

The lower frames 30 are formed to extend in the stacking direction of the discharge electrodes 12 and the dust collecting electrodes 13 and are supported by the insulating connecting members 40. Two lower frames 30 are arranged in parallel, and two insulating connecting members 40 are provided to each lower frame 30. The lower frames 30 are provided with a plurality of cradles 35 protruding inward, towards the inner surface of the opposite lower frame 30, and the first setting beams 14 are mounted on the cradles 35.

The lower supports 51 are fixed to the lower frames 30 at the outer sides of and at the center of the dust collection module 100, respectively. The lower support 51 includes side protrusions 51a positioned on the lower frames 30, lower protrusions 51b projecting downward to abut the side surface of the lower frame 30, and a support bar 51c to which the first tie rod 16 is fixed.

The lower support 51 is provided with a plurality of connectors 55 to which the first tie rods 16 are screw-coupled. Longitudinal ends of the first tie rods 16 are respectively fixed between the central lower support 51 and one or the other of the outer lower supports 51.

As described above, according to the first embodiment, the dust collecting module 100 can be easily fixed to the frame assembly 20 by fastening the first tie rods 16 to the lower supports.

The lower frames 30 are provided with the insulating connecting members 40 each having a high voltage terminal rod 42 for applying a high voltage to the discharge electrode 12 and a lower insulator 41. A hole for injecting air downward may be formed in the lower portion of the insulating connecting member 40. The high voltage terminal rod 42 protrudes downward through the hole and is fixed to the lower frame 30. The high voltage terminal rod 42 is provided with an anchor 43 for supporting the lower frame 30.

Accordingly, a high voltage is applied to the discharge electrode 12 through the lower frames 30 and the first setting beams 14. Further, the lower frames 30 are installed in a state of being suspended from the insulating connecting members 40.

The insulating connecting member 40 is installed in the tubular girder 48 having an inner space, and the tubular girder 48 is formed to extend in the same direction as the lower frame 30. The tubular girder 48 may be fixedly installed on an inner wall of the absorption tower 1200, and may be provided with an air supply therein. A high voltage source is connected to the insulating connecting member 40, and the high voltage terminal rod 42 is fixed to the tubular girder 48 via the lower insulator 41 for electric insulation. Accordingly, the high voltage terminal rod 42 may be charged with a high voltage, and the tubular girder 48 may be grounded.

The second setting beams 15 are fixed to an upper surface of the tubular girder 48 such that their lower ends are fixed to the tubular girder 48 by means of welding or the like. The second setting beams 15 are arranged to extend in the same direction as the longitudinal direction of the tubular girder 48.

Figure 6:
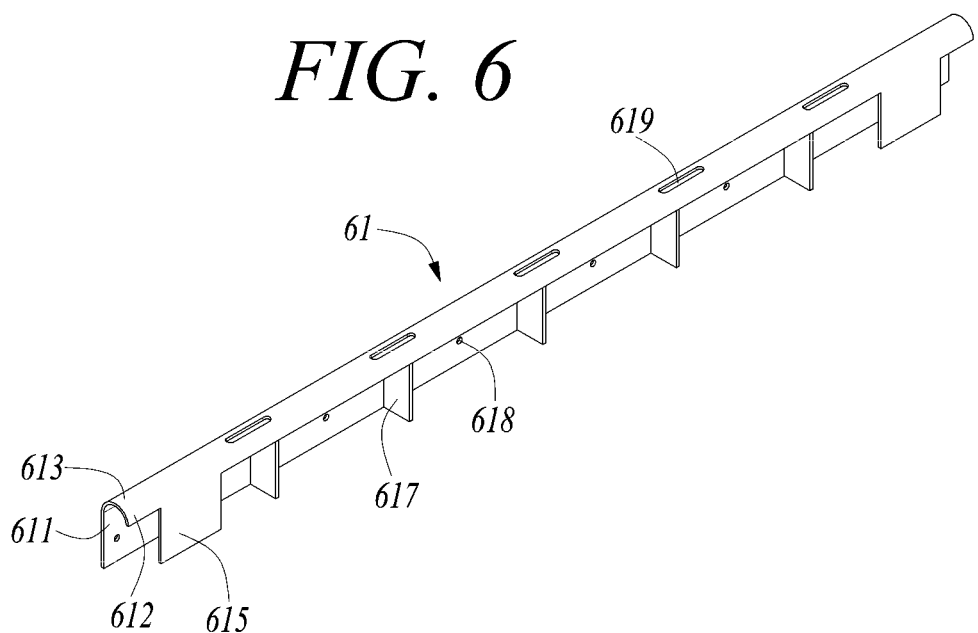
FIG. 6 is a perspective view showing an outer upper support according to the first embodiment of the present invention.
Figure 7:
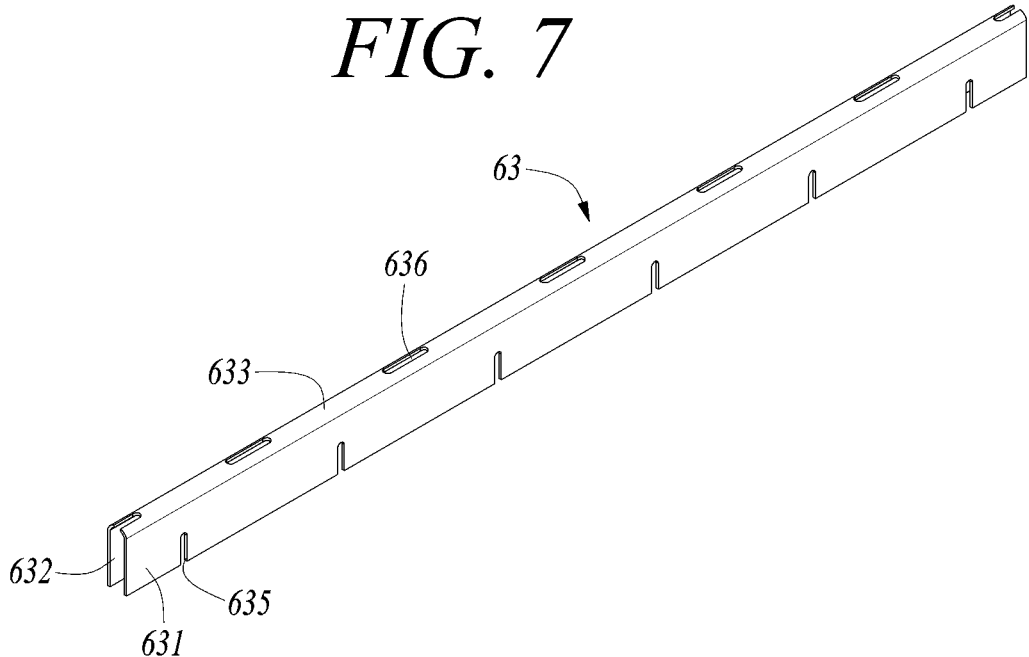
FIG. 7 is a perspective view showing a center upper support according to the first embodiment of the present invention.

FIG. 6 illustrates one of the outer upper supports 61 according to the first embodiment of the present invention, and FIG. 7 illustrates a central upper support 63 according to the first embodiment. Here, the outer upper supports 61 are disposed on the upper side of the dust collecting module 100 on both outer ends. The central upper support 63 may be disposed between the outer upper supports 61 at the upper center of the dust collecting module 100. The supports 61 and 63 are provided with a plurality of connectors 65 (FIG. 5) to which the first tie rods 16 are screw-coupled and fixed. That is, longitudinal ends of the first tie rods 16 are respectively fixed between the central upper support 63 and one or the other of the outer upper supports 61.

Referring to FIGS. 6 and 7, each of the outer upper supports 61 includes a front plate 611 and a rear plate 612 facing each other and a support plate spine 613 connecting the front and rear plates 611 and 612. The front plate 611 and the rear plate 612 may each be basically planar, and the support plate spine 613 may be curved. The support plate spine 613 is provided with a plurality of holes 619 for venting the cleaning water. Also, the front plate 611 may have holes 618 for engagement with the connectors.

The rear plate 612 has a smaller height (is shorter) than the front plate 611. Coupling plate parts 615 are coplanar with and extend downward from the rear plate 612 and are respectively disposed near the ends of the rear plate 612, that is, where the pressing locking members 70 are coupled. The coupling plate parts 615 are positioned at both longitudinal edges of the outer upper support 61.

Each outer upper support 61 further includes a plurality of reinforcing ribs 617 positioned between the front plate 611 and the rear plate 612 such that the reinforcing ribs 617 are respectively connected to inner surfaces of both of the plates 611 and 612 and thereby support them. The reinforcing ribs 617 are spaced apart in the longitudinal direction of the outer upper support 61.

The central upper support 63 includes two opposing walls 631 and 632 and a curved support spine 633 connecting the walls 631 and 632. The walls 631 and 632 are each provided with a plurality of grooves 635 into which the connectors 65 are inserted, and the support spine 633 may be provided with a plurality of holes 636 for venting the cleaning water.

The pressing locking members 70 are connected to the outer upper support 61. The pressing locking members 70 are fixedly mounted on the outer upper support 61 while applying a compressing force inwards to the outer upper support 61 to reduce the vibration of the dust collecting module 100.

Figure 8:
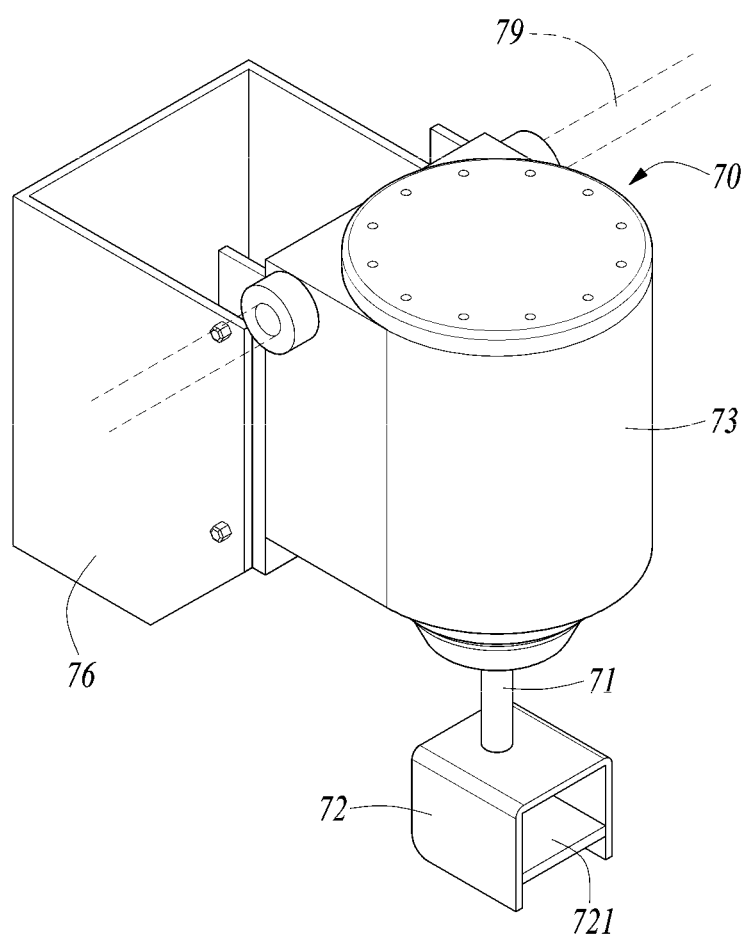
FIG. 8 is a perspective view showing a pressing locking member according to the first embodiment of the present invention.
Figure 9:
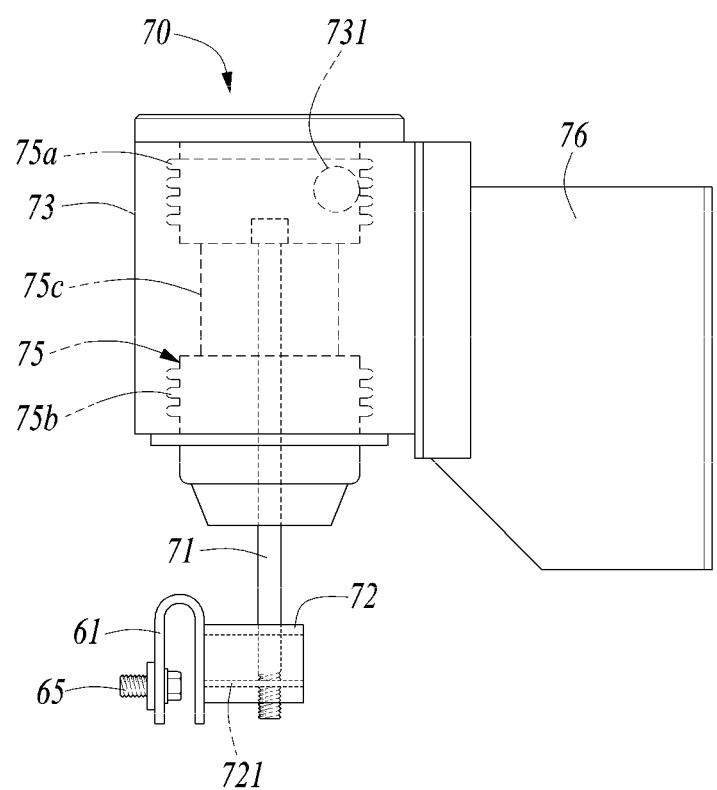
FIG. 9 is a side view showing the pressing locking member according to the first embodiment of the present invention.

FIGS. 8 and 9 show a pressing locking member 70 according to the first embodiment of the present invention.

Referring to FIGS. 8 and 9, the pressing locking member 70, which is fixed to an inner wall of the absorption tower 1200, includes a housing 73, an insulator 75 provided in the housing 73, a compressing rod 71 coupled to the insulator 75, and a compressing support 72 coupled to the compressing rod 71.

The housing 73 is formed in a cylindrical shape having an inner space, and a bracket 76 for fixing to the absorption tower 1200 is fixed to one side of the housing 73. An air inlet 731 may be installed in the housing 73, and a purge air supply pipe 79 may be connected to the air inlet 731. The purge air introduced into the housing 73 is discharged downwards so as to prevent a short circuit due to moisture.

The insulator 75 may include a top insulator part 75a fixed to the upper portion of the housing 73, a lower insulator part 75b fixed to the lower portion of the housing 73, and an insulating tube 75c connecting the upper insulator part 75a and the lower insulator part 75b. The compressing rod 71 is fixed to the insulator 75 so as to protrude from the lower portion of the pressing locking member 70. A lower portion of the compressing rod 71 may be threaded for engagement with the compressing support 72.

The compressing support 72 is fixed to the lower portion of the compressing rod 71 and includes an inner support plate 721 for engagement with the compressing rod 71 by way of, for example, correspondingly threaded surfaces. The compressing support 72 abuts the outer upper support 61 so as to compress the outer upper support 61 towards the inside of the dust collecting module 100.

In this embodiment, when the outer upper support 61 is pressed by the pressing locking member 70, the vibration of the dust collecting module 100 can be effectively reduced.

Hereinafter, a desulfurization apparatus according to a second embodiment of the present invention will be described.

Figure 10:
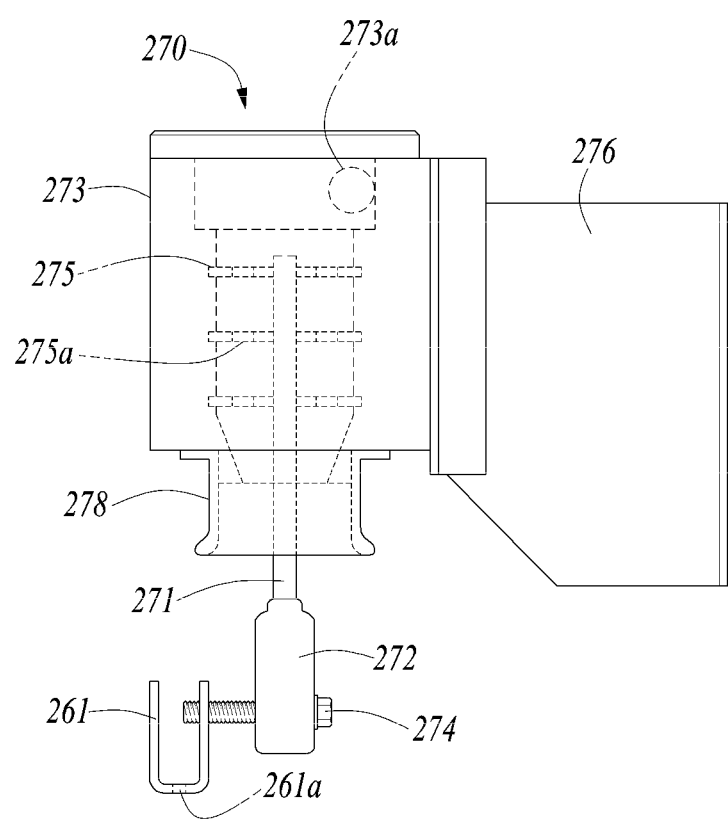
FIG. 10 is a side view showing a pressing locking member according to a second embodiment of the present invention.

FIG. 10 shows a pressing locking member 270 according to the second embodiment of the present invention. Here, a dust collecting module according to a second embodiment has the same structure as that of the dust collecting module according to the first embodiment except for the pressing locking member 270 and an outer upper support 261, so duplicate description of the same configuration will be omitted.

Referring to FIG. 10, the pressing locking member 270, which is fixed to an inner wall of the absorption tower 1200, includes a housing 273, a plurality of insulators 275 provided in the housing 273, a compressing rod 271 coupled to the insulators 275, a compressing support 272, and a support bolt 274.

The housing 273 has a cylindrical shape with an inner space, and a bracket 276 for attachment to the absorption tower 1200 is mounted on one side of the housing 273. An air inlet 273a may be provided in the housing 273 and a purge air supply pipe may be connected to the air inlet 273a.

A lower portion of the housing 273 is provided with a support tube 278 protruding downward. The purge air introduced into the housing 273 is discharged downwards through the support tube 278, thereby preventing a short circuit due to moisture.

The insulators 275 are each formed in a planar shape and are spaced apart from each other in the housing 273 in the height direction. Each insulator 275 insulates the compressing rod 271 from the housing 273 and supports the compressing rod 271. A plurality of vent holes 275a for the passage of purge air is formed in each insulator 275, and the compressing rod 271 is inserted into the center of each insulator 275.

The compressing rod 271 is fixed to the insulators 275 to protrude from the lower portion of the pressing locking member 270. The compressing support 272 is formed in a planar shape and is fixed to the lower portion of the compressing rod 271. A support bolt 274 is provided on the compressing support 272. The support bolt 274 is coupled to the outer upper support 261 to fasten the dust collecting module. The support bolt 274 may be moved with respect to the outer upper support 261 so that a compressing force can be adjusted. That is, rotation of the support bolt 274 may occur with respect to the outer upper support 261 to move the outer upper support 261 and thereby adjust the compressing force.

The outer upper support 261 has a U-shaped cross section including one or more bends oriented downwards, and a hole 261a for discharging water is formed at the bottom of the outer upper support 261.

When the support bolt 274 is installed as described in the second embodiment, the outer upper support 261 and the pressing locking member 270 can be more stably coupled.

Hereinafter, a desulfurization apparatus according to a third embodiment of the present invention will be described.

Figure 11:
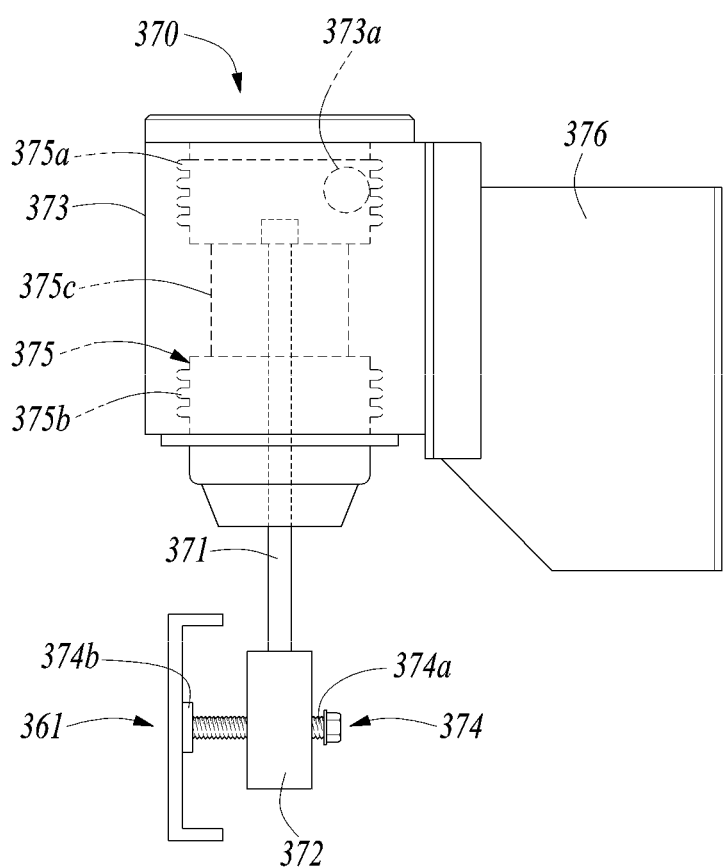
FIG. 11 is a side view showing a pressing locking member according to a third embodiment of the present invention.

FIG. 11 shows a pressing locking member according to the third embodiment of the present invention. Here, a dust collecting module according to the third embodiment has the same structure as that of the dust collecting module according to the first embodiment except for a pressing locking member 370 and an outer upper support 361, so duplicate description of the same configuration will be omitted.

Referring to FIG. 11, the pressing locking member 370, which is fixed to an inner wall of the absorption tower 1200, includes a housing 373, an insulator 375 provided in the housing 373, a compressing rod 371 coupled to the insulator 375, and a compressing support 372 coupled to the compressing rod 371.

The housing 373 has a cylindrical shape with an inner space, and a bracket 376 for attachment to the absorption tower 1200 is mounted on one side of the housing 373. An air inlet 373a may be provided in the housing 373 and a purge air supply pipe may be connected to the air inlet 373a. The purge air introduced into the housing 373 prevents a short circuit due to moisture while being discharged downwards.

The insulator 375 has an upper insulator part 375a fixed to the upper portion of housing 373, a lower insulator part 375b fixed to the lower portion of housing 373, and an insulator tube 375c connecting the upper insulator part 375a and the lower insulator part 375b. The compressing rod 371 is fixed to the insulator 375 to protrude from the lower portion of the pressing locking member 370. A lower portion of the compressing rod 371 is threaded for engagement with the compressing support 372.

The compressing support 372 is a planar support that is fixed to the lower portion of the compressing rod 371. An adjustment member 374 for adjusting a compressing force is movably mounted on the compressing support 372. The adjustment member 374 is screwed into the compressing support 372 so that the adjustment member is movable with respect to the compressing support 372. The adjustment member 374 also includes an adjusting bolt 374a and a pressure distributing plate 374b coupled to the adjusting bolt 374a. The adjusting bolt 374a moves forward or backward according to its rotating direction to adjust the compressing force. The pressure distributing plate 374b is a planar plate that transmits pressure transferred from the adjusting bolt 374a to the outer upper support 361.

The outer upper support 361 includes a base plate part and wing parts protruding rearward from upper and lower ends of the base plate part. The pressure distributing plate 374b abuts the base plate part to press the base plate part towards the inside of the dust collecting module.

When the adjustment member 374 is provided as in the third embodiment, the compressing force transmitted by the pressing locking member 370 can be more easily controlled.

Hereinafter, a dust collecting module according to a fourth embodiment of the present invention will be described.

Figure 12:
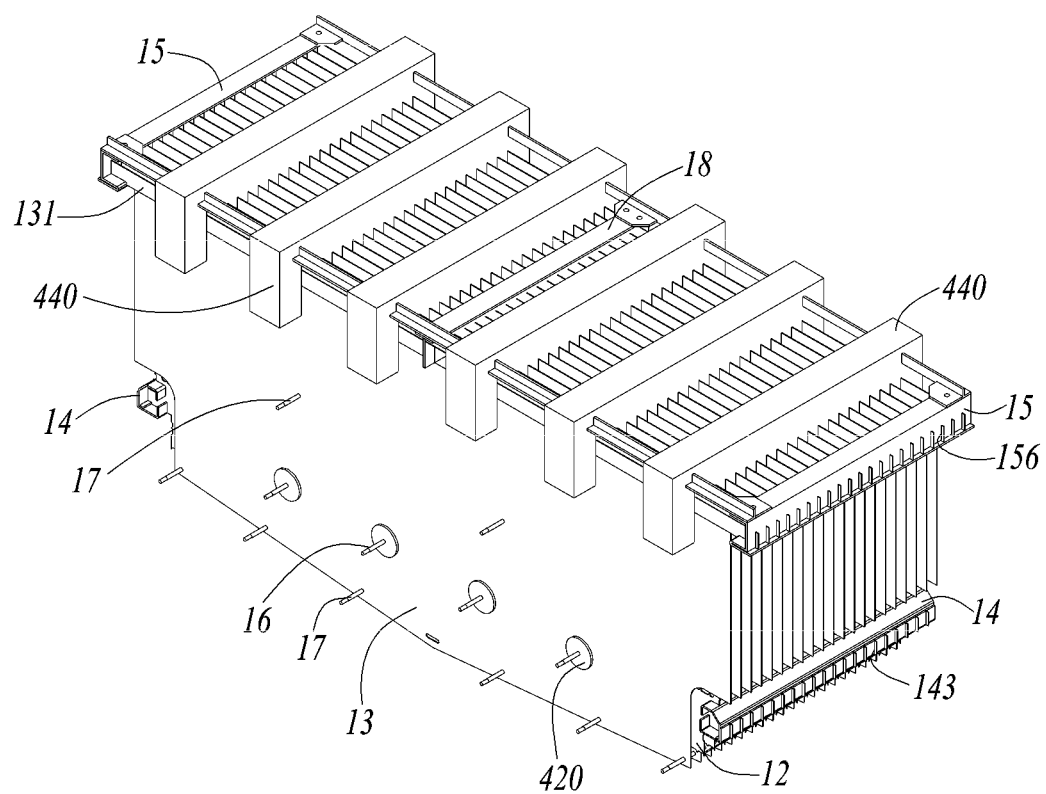
FIG. 12 is a perspective view showing a dust collecting module according to a fourth embodiment of the present invention.
Figure 13:
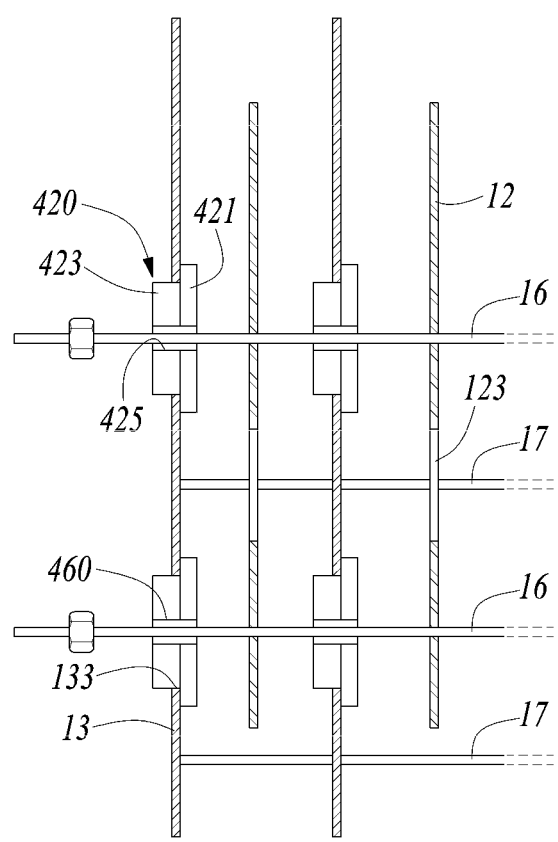
FIG. 13 is a longitudinal sectional view showing part of the dust collecting module according to the fourth embodiment of the present invention.
Figure 14:
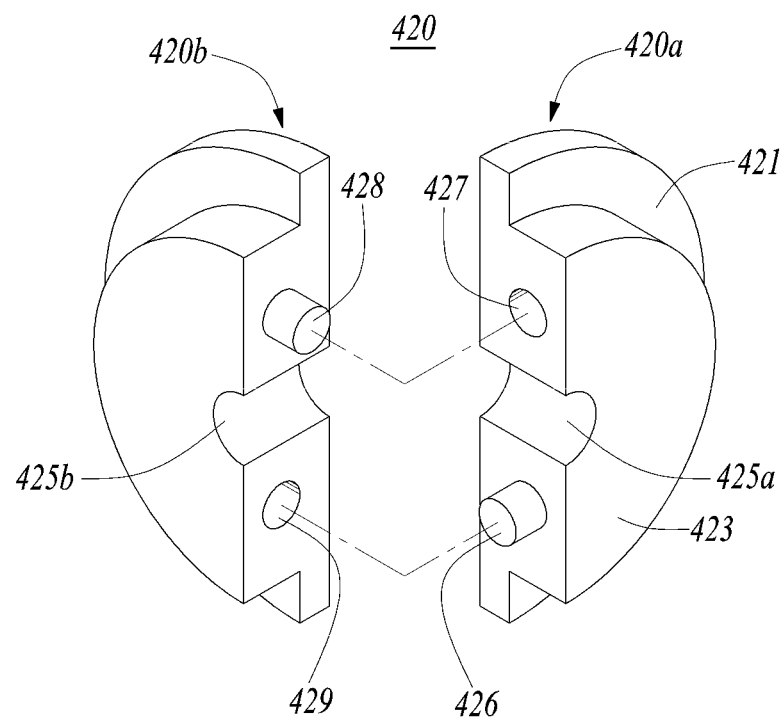
FIG. 14 is an exploded perspective view showing a hole jig according to the fourth embodiment of the present invention.

FIGS. 12 and 13 show a dust collecting module according to a fourth embodiment of the present invention, and FIG. 14 shows a hole jig according to the fourth embodiment. Here, the dust collecting module according to the fourth embodiment has the same structure as that of the dust collecting module according to the first embodiment except for a hole jig 420 and an upper jig 440, so duplicate description of the same configuration will be omitted.

Referring to FIGS. 12 to 14, the dust collecting electrode 13 is provided with a first hole 133, and the discharge electrode 12 is provided with a second hole 123. A hole jig 420 is fixedly inserted into the first hole 133 to prevent the discharge electrode 12 and the dust collecting electrode 13 from colliding with each other.

The hole jig 420 is fitted into and coupled to the first hole 133 and has a greater thickness than the discharge electrode 12. The hole jig 420 protrudes beyond opposite surfaces of the discharge electrode 12 so as to protect the discharge electrode 12.

The hole jig 420 includes a base part 421 contacting the surface of the dust collecting electrode 13 and a support protrusion 423 protruding from the base part 421 through the first hole 133. The base part 421 is formed in a disk shape, and the support protrusion 423 also has a circular cross section. A center hole 425 is formed in the center of the hole jig 420 to receive the first tie rod 16, and a fitting tube 460 may be provided in the center hole 425 to correct a diameter of the first tie rod 16 and/or an inner diameter of the center hole 425. The fitting tube 460 may be made of synthetic resin.

The hole jig 420 is formed to be divided into two halves with reference to a virtual plane passing through the center hole 425. The hole jig 420 includes a first jig part 420a and a second jig part 420b, which are engaged with each other. The first jig part 420a and the second jig part 420b each have a semicircular cross section, and the side surfaces of the first and second jig parts 420*a* and 420*b* are brought into contact with and coupled to each other.

The side surface of the first jig part 420*a* is provided with a first coupling protrusion 426 and a first coupling groove 427. The side surface of the second jig part 420*b* is provided with a second coupling groove 429 into which the first coupling protrusion 426 is inserted, and a second coupling protrusion 428 to be inserted into the first coupling groove 427. Accordingly, the first jig part 420*a* and the second jig part 420*b* can be stably engaged with each other.

A first central groove 425*a* is formed in the first jig part 420*a* and a second central groove 425*b* is formed in the second jig part 420*b* so that when engaged with each other, the first central groove 425*a* and the second central groove 425*b* form a center hole 425.

The hole jigs 420 are disposed at the upper and lower portions of the respective discharge electrodes 12, so that a total of eight to ten hole jigs 420 may be installed for one discharge electrode 12. When the hole jig 420 is detachably formed as in this embodiment, the hole jig 420 can be easily coupled to the first tie rod 16 and inserted into and removed from the dust collecting electrode 13.

Figure 15:
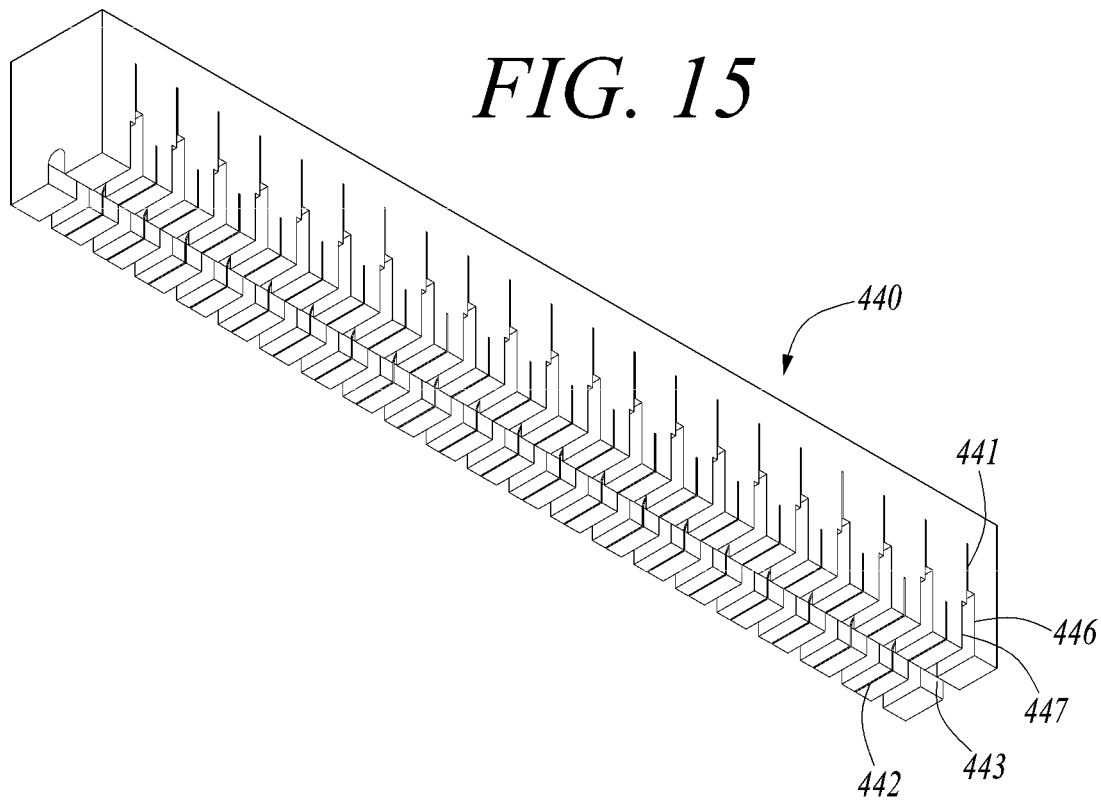
FIG. 15 is a perspective view of the bottom of an upper jig according to the fourth embodiment of the present invention.

FIG. 15 is a perspective view of the bottom of the upper jig 440 according to the fourth embodiment of the present invention.

Referring to FIGS. 12 and 15, the upper end of the dust collecting module 100 is provided with upper jigs 440 each having first slots 441 into which upper ends of the dust collecting electrodes 13 are inserted and second slots 442 into which upper ends of the discharge electrodes 12 are inserted. The upper jig 440 has the general shape of a rod extending in the stacking direction of the dust collecting electrodes 13 and supports the discharge electrodes 12, the dust collecting electrodes 13, the inserted hole jigs 420, and the inserted first tie rods 16.

To this end, the upper jig 440 may be provided with a rod groove 443 into which the first tie rod 16 is inserted. The rod groove 443 extends in the longitudinal direction of the upper jig 440. The upper jig 440 is provided with first step portions 446 into which the base parts 421 are respectively inserted and second stepped portions 447 into which the support protrusions 423 are respectively inserted. The first and second stepped portions 446 and 447 communicate with the first slots 441, respectively, wherein each first stepped portion 446 is located behind a corresponding first slot 441, and each second stepped portion 447 is located in front of the corresponding first slot (see FIG. 5).

When the upper jig 440 is formed as described above, the discharge electrodes 12 and the dust collecting electrodes 13 can be more stably protected.

Hereinafter, a dust collecting module according to a fifth embodiment of the present invention will be described.

Figure 16:
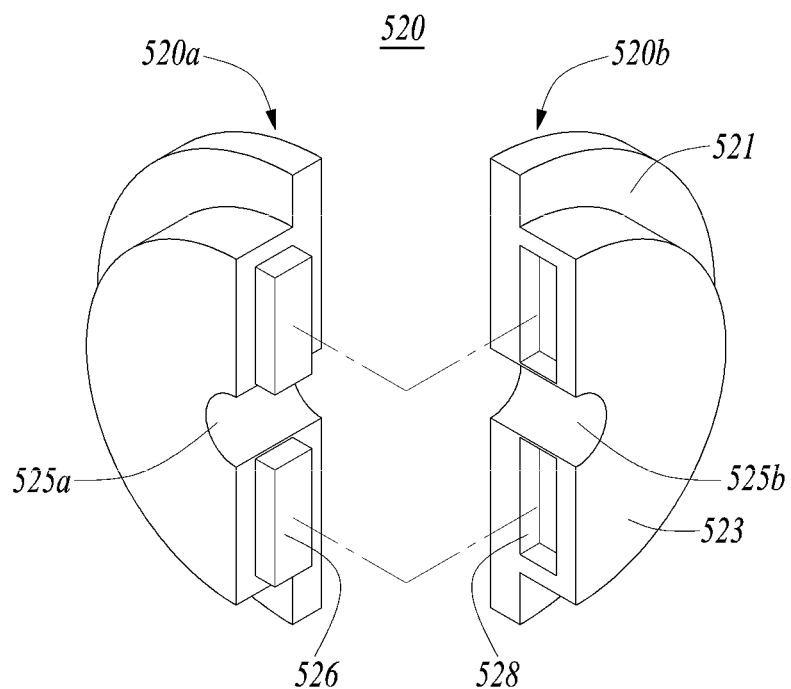
FIG. 16 is an exploded perspective view showing a hole jig according to a fifth embodiment of the present invention.

FIG. 16 shows a hole jig according to a fifth embodiment of the present invention. Here, the dust collecting module according to the fifth embodiment has the same structure as that of the dust collecting module according to the first embodiment except for a hole jig 520, so duplicate description of the same configuration will be omitted.

Referring to FIG. 16, the hole jig 520 is inserted into the first hole formed in the dust collecting electrode to prevent the discharge electrode and the dust collecting electrode from colliding with each other. The hole jig 520 includes a base part 521 contacting the surface of the dust collecting electrode and a support protrusion 523 protruding from the base part 521 through the first hole 133. The base part 521 has a disk shape, and the support protrusion 523 has a circular cross section. The center of the hole jig 520 is provided with a center hole into which the first tie rod 16 is inserted.

The hole jig 520 is formed to be divided into two halves with reference to a virtual plane passing through the center hole. The hole jig 520 includes a first jig part 520*a* and a second jig part 520*b*, which are engaged with each other. The first jig part 520*a* and the second jig part 520*b* each have a semicircular cross section, and the side surfaces of the first and second jig parts 520*a* and 520*b* are brought into contact with and coupled to each other.

The side surface of the first jig part 520*a* is provided with two coupling protrusions 526, and the side surface of the second jig part 520*b* is provided with two coupling grooves 528 into which the two coupling protrusions 526 are inserted. Accordingly, the first jig part 520*a* and the second jig part 520*b* can be stably engaged with each other.

A first central groove 525*a* is formed in the first jig part 520*a* and a second central groove 525*b* is formed in the second jig part 520*b* so that when engaged with each other, the first central groove 525*a* and the second central groove 525*b* form a center hole.

Hereinafter, a dust collecting module according to a sixth embodiment of the present invention will be described.

Figure 17:
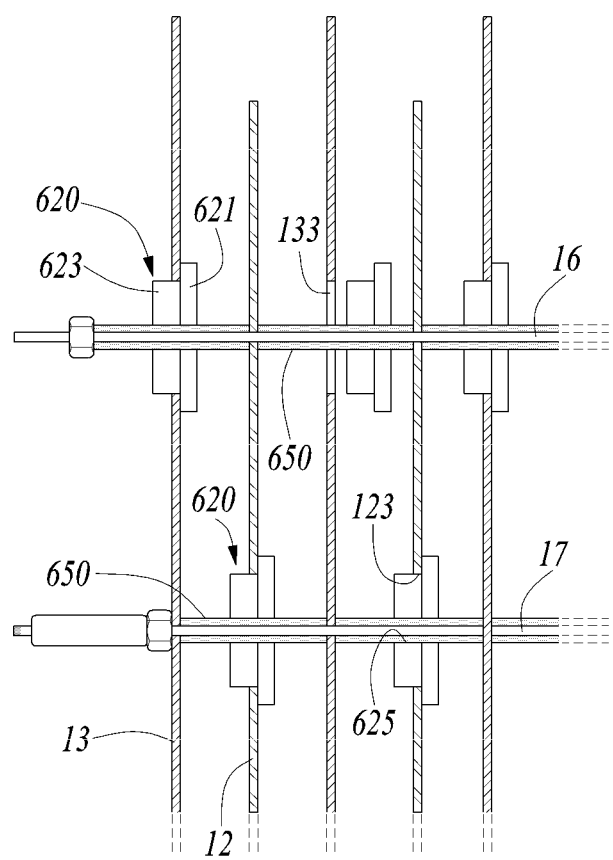
FIG. 17 is a longitudinal sectional view showing part of a dust collecting module according to a sixth embodiment of the present invention.

FIG. 17 shows part of a dust collecting module according to a sixth embodiment of the present invention. Here, the dust collecting module according to the sixth embodiment has the same structure as that of the first embodiment except for a structure in which a hole jig 620 is installed on the discharge electrode 12 and the dust collecting electrode 13, so duplicate description of the same configuration will be omitted.

Referring to FIG. 17, a first hole 133 is formed in the dust collecting electrode 13, and a second hole 123 is formed in the discharge electrode 12. A first tie rod 16 is provided on the discharge electrode 12 to fix the discharge electrode 12, and a second tie rod 17 is provided on the dust collecting electrode 13 to fix the dust collecting electrode 13. The first tie rod 16 is installed to pass through the first hole 133 and the second tie rod 17 is installed to pass through the second hole 123.

The first and second tie rods 16 and 17 are each provided with a spacer 650 for maintaining a distance between the dust collecting electrode 13 and the discharge electrode 12. The spacer 650 provided to the first tie rod 16 abuts the surface of the discharge electrode 12 in the longitudinal direction and passes through the first hole 133. The spacer 650 provided to the second tie rod 17 abuts the surfaces of the dust collecting electrode 13 in the longitudinal direction and passes through the second holes 123.

The hole jigs 620 are inserted into and coupled to the first and second holes 133 and 123. The hole jig 620 includes a base part 621 contacting the surface of the dust collecting electrode and a support protrusion 623 protruding from the base part 621 through the first hole 133. The base part 621 is formed in a disk shape, and the support protrusion 623 also has a circular cross section. A center hole 625 is formed in the center of the hole jig 620 to receive the first tie rod 16. The hole jig 620 is formed to be divided into two halves with respect to a virtual plane passing through the center of the hole jig 620.

A spacer 650 is inserted into the center hole 625 formed in the hole jig 620, and the hole jig 620 is engaged with the first tie rod 16 or the second tie rod 17 via the spacer 650. The spacer 650 is installed to pass through the hole jig 620.

According to the sixth embodiment, since the hole jigs 620 are provided to the discharge electrode 12 and the dust collecting electrode 13, and the spacer 650 supports the dust collecting electrode 13 and the discharge electrode 12, the dust collecting electrode 13 and the discharge electrode can be more stably protected.

While the exemplary embodiments of the present invention have been described in the detailed description, the present invention is not limited thereto, but should be construed as including all of modifications, equivalents, and substitutions falling within the spirit and scope of the invention defined by the appended claims.

What is claimed is:

1. A desulfurization apparatus comprising:
    an absorption tower having a columnar shape extending in a height direction, the absorption tower including a lower side in which an exhaust gas inlet is formed and an upper side in which an exhaust gas outlet is formed, such that exhaust gas introduced into the absorption tower through the exhaust gas inlet flows upward;
    a plurality of absorption liquid supply pipes that are disposed above the exhaust gas inlet in the height direction of the absorption tower and extend in a transverse direction of the absorption tower;
    a dust collecting module including a plurality of discharge electrodes and a plurality of dust collecting electrodes disposed such that the discharge electrodes and the dust collecting electrodes are erected in the height direction of the absorption tower, the dust collecting module disposed below the exhaust gas outlet and above the absorption liquid supply pipes in the height direction of the absorption tower; and
    at least one pressing locking member fixed to an inner wall of the absorption tower and configured to apply a compressing force inwardly to the dust collecting module and to reduce vibration in the dust collecting module by the inward application of the compressing force.

2. The desulfurization apparatus of claim 1, wherein the at least one pressing locking member includes a housing, an insulator provided in the housing, and a compressing rod coupled to the insulator.

3. The desulfurization apparatus of claim 2, wherein the at least one pressing locking member further includes a compressing support fixed to the compressing rod to compress the dust collecting module.

4. The desulfurization apparatus of claim 3, further comprising a support bolt provided to the compressing support such that the support bolt is able to be bolted to the dust collecting module.

5. The desulfurization apparatus of claim 3, further comprising an adjustment member movably screwed to the compressing support to adjust a compressing force applied by the at least one pressing locking member.

6. The desulfurization apparatus of claim 2, further comprising a support tube provided at a lower portion of the housing, wherein the compressing rod passes through the support tube.

7. The desulfurization apparatus of claim 6, further comprising an air inlet formed on one side of the housing, and a purge air supply pipe connected to the air inlet, wherein purge air is discharged through the support tube.

8. The desulfurization apparatus of claim 1, wherein the dust collecting module further includes a first tie rod that is fixed to the discharge electrodes and that passes through the dust collecting electrodes.

9. The desulfurization apparatus of claim 1, further comprising:
    an upper support arranged externally with respect to the dust collecting module to extend in a width direction of the dust collecting module; and
    a first tie rod that passes through the dust collecting module and is fixed to the upper support.

10. The desulfurization apparatus of claim 1, further comprising:
    two upper supports respectively provided at outer sides of the dust collection module; and
    a single central upper support provided at a center of the dust collection module,
    wherein the at least one pressing locking member includes a pair of pressing locking members respectively configured to apply the compressing force inwardly against either of the two upper supports.

11. The desulfurization apparatus of claim 9, wherein the upper support comprises:
    a front plate;
    a rear plate disposed opposite to the front plate, the rear plate having a smaller height than the front plate; and
    a support plate spine connecting the front plate and the rear plate.

12. The desulfurization apparatus of claim 11, wherein the upper support further comprises:
    a coupling plate part extending downward from a portion of the rear plate to which the pressing locking member is coupled; and
    a plurality of reinforcing ribs disposed between the front plate and the rear plate.

13. The desulfurization apparatus of claim 1, further comprising a plurality of upper insulators disposed inside the pressing locking member, each upper insulator having a planar shape in which a vent hole is formed for passage of purge air.

* * * * *